US012771688B2

(12) United States Patent
(10) Patent No.: US 12,771,688 B2
(45) Date of Patent: Oct. 20, 2026

Yong Li et al.

(54) MACHINE LEARNING PROXY SYSTEM

(71) Applicant: Avago Technologies International Sales Pte. Ltd., Singapore (SG)

(72) Inventors: Gordon Yong Li, San Diego, CA (US); Xuemin Chen, Rancho Santa Fe, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 15 days.

(21) Appl. No.: 18/932,025

(22) Filed: Oct. 30, 2024

(65) Prior Publication Data

US 2026/0122066 A1 Apr. 30, 2026

(51) Int. Cl.
*H04L 9/40* (2022.01)

(52) U.S. Cl.
CPC ...... *H04L 63/0869* (2013.01); *H04L 63/0281* (2013.01)

(58) Field of Classification Search
None
See application file for complete search history.

(56) References Cited

U.S. PATENT DOCUMENTS

2018/0287920 A1* 10/2018 Sanganabhatla ...... H04L 67/303
2020/0358599 A1* 11/2020 Baracaldo Angel .... H04L 9/085
2020/0364542 A1* 11/2020 Sun .......................... G06N 3/08
2021/0136170 A1* 5/2021 Katre .................... G06F 9/5038
2022/0239758 A1* 7/2022 Klein ....................... G06N 5/04
2023/0020939 A1* 1/2023 Klein ....................... G06N 3/09

* cited by examiner

*Primary Examiner* — Fatoumata Traore

(74) *Attorney, Agent, or Firm* — King Intellectual Asset Management

(57) ABSTRACT

A system is provided that includes a machine learning (ML) application client configured to monitor data streams communicated with a connected device for application data associated with the ML application client, and to capture the associated application data. An ML proxy client is configured to receive an application request from the ML application client, where the application request includes the application data captured by the ML application client; send a proxy request to an ML proxy server, where the proxy request includes the application data and an indicated inference operation to be performed on the application data; receive a proxy response from the ML proxy server, where the proxy response includes a result of the inference operation performed on the application data; and send a report based on the proxy response to a controller outside the first network.

20 Claims, 11 Drawing Sheets

MACHINE LEARNING PROXY SYSTEM

TECHNICAL FIELD

The present description relates in general to service provider data networks including, for example, the use of machine learning applications across service provider data networks.

BACKGROUND

Service provider data networks may be used for delivering services such as video content, Internet access, telephony, gaming, etc. to subscribers. Service providers increasingly are using applications that incorporate machine learning operations for tasks such as network monitoring and performance evaluation, troubleshooting issues, and improving customer experience. Additionally, machine learning operations are being used to support and enhance the capabilities of Internet of Things (IoT) devices. In a cloud-based approach, data may be collected by devices at various locations within a service provider data network and sent to the cloud for processing, including machine learning operations. However, this cloud-based approach may be inefficient in utilizing the bandwidth and storage capabilities of the network, may increase latency in the applications using the machine learning operations, and may expose sensitive information in the data to parties outside of the service provider data network.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form to avoid obscuring the concepts of the subject technology.

Machine learning (ML) functionality such as neural network processing is being added to many different types of devices. For example, ML systems (e.g., ML processing engine, neural processing unit, hardware accelerator, etc.) are being implemented in customer premises equipment (CPE) such as cable modems, set top boxes, routers, etc. As these ML-enabled edge devices are rolled out across a service provider data network, the service provider is able to take advantage of these edge devices to facilitate and improve the use of ML applications to manage the data network.

The subject technology provides solutions that leverage the processing and computational resources of ML-enabled edge devices to service ML applications running local to the edge devices on the service provider data network. According to aspects of the subject technology, an ML-enabled edge device may act as an ML proxy for devices and applications running on a local area network located at a customer's premises. For example, a cable gateway/modem may receive a request for an ML operation from an ML application running on the local area network. Rather than sending the request and associated data outside the local area network to the cloud for processing, the cable gateway/modem may request an ML-enabled CPE device, such as a set top box, operating as an ML proxy server to process the ML operation. The ML proxy server may perform the requested ML operation (e.g., inference) and return the results to the cable gateway/modem. The cable gateway/modem may report the results to an operator server on the cloud for use by the operator. In this manner, using the ML proxy server to process the ML request locally removes the need to send data outside the local area network but still allows the operator to utilize the ML application. Accordingly, any sensitive information that may be included in the data remains on the local area network and the bandwidth/storage resources of the service provider data network may be conserved by keeping the ML processing within the local area network. Examples and descriptions of these and other features of the subject technology are provided in more detail below.

Figure 1:
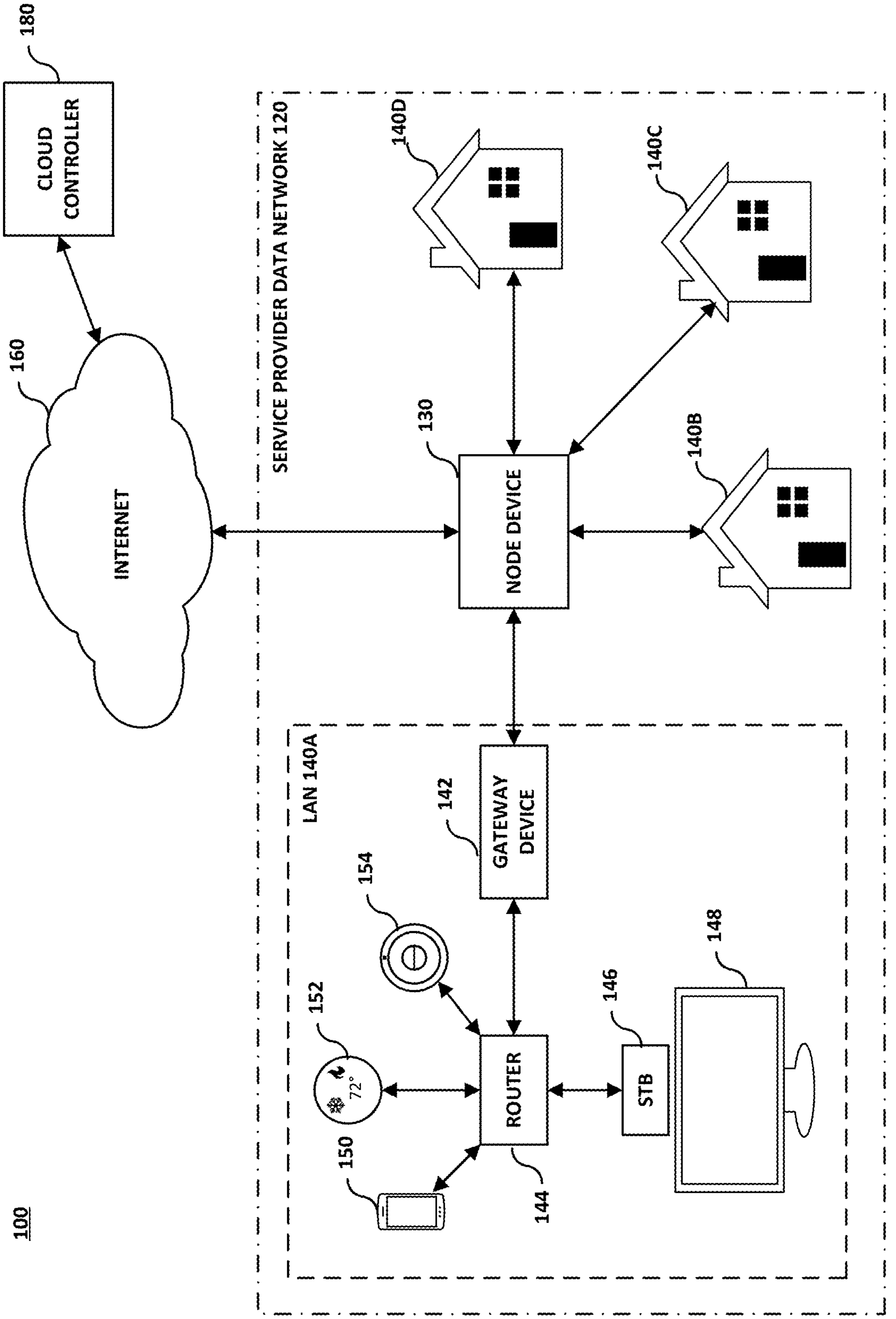
FIG. 1 illustrates an example of a network environment in which aspects of the subject technology may be implemented.

FIG. 1 illustrates an example of a network environment 100 in which aspects of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings) are not limited to direct connections or direct couplings and may be implemented with one or more intervening components unless expressly stated otherwise.

The example network environment 100 includes service provider data network 120 configured to provide services (e.g., video content, data, telephony, gaming, etc.) to local area networks (LANs) 140A-140D operating at respective customer premises. The services may be internal to service provider data network 120 or may involve resources communicated with service provider data network 120 via public communications networks such as Internet 160. Communications within service provider data network 120 may be provided using various types of transmission media including, but not limited to, coaxial lines, fiber optic lines, wireless connections, etc. Service provider data network 120 may use a single type of transmission media or a combination of transmission media types. For example, node device 130 of service provider data network 120 may transmit and receive data over Internet 160 via fiber optic lines and use coaxial lines for data transmissions with LANs 140A-140D. Service provider data network 120 may include additional node devices connected to different numbers and/or configurations of LANs. In addition, service provider data network 120 may include one or more head end systems (not shown) configured to distribute services to node devices, monitor performance of service provider data network 120, couple service provider data network 120 to resources outside of the network, such as Internet 160, or manage customer access and billing with respect to the services provided by service provider data network 120.

Node device 130 of service provider data network 120 represents a system configured to distribute communications to LANs operating at customers' premises within service provider data network 120. Node device 130 may include hardware and software components configured to translate communication protocols for communications received on one type of transmission media (e.g., fiber optic lines) and distributed on a second type of transmission media (e.g., coaxial lines), as well as make routing decisions for directing communications to their intended destinations.

As depicted in FIG. 1, LAN 140A includes gateway device 142, router 144, and set top box (STB) 146. Briefly, gateway device 142 is configured to communicatively connect LAN 140A to service provider data network 120 and to facilitate communications between the two networks. Gateway device 142 may be implemented as a passive optical network (PON) modem, a Data Over Cable Service Interface Specifications (DOCSIS) cable modem, a PON optical line terminal (OLT) device, a DOCSIS remote physical-layer (-node) device (RPD), or a remote physical and MAC layers (node) device (RMD), etc. Router 144 is configured to route communications to their intended destinations within LAN 140A. Connections between router 144 and other elements of LAN 140A may be wired (e.g., Ethernet) and/or wireless (WiFi using IEEE 802.11 standards). STB 146 represents an appliance configured to facilitate access to and consumption of services provided by service provider data network 120. For example, video content may be received, decoded, and provided for display on a display device such as television 148. While gateway device 142, router 144, and STB 146 are depicted as three distinct devices, some or all of the functionality provided by these devices may be combined into a single device such as a router-gateway device. Aspects of gateway device 142, router 144, and STB 146 are described in more detail below.

FIG. 1 illustrates a number of connected devices in communication with router 144. The connected devices include smartphone 150, thermostat 152, and camera 154. Smartphone 150 represents a connected user device through which a user may access and consume services provided by service provider data network 120. The services may include data/Internet access, video content, gaming, etc. The subject technology is not limited to smartphones and may involve other types of electronic user devices such as laptop computers and tablets. Thermostat 152 and camera 154 represent examples of connected Internet of Things (IoT) devices configured to collect and exchange data with other devices and systems to provide information and functionality to a user. IoT devices may use various sensors (e.g., temperature gauge, motion sensors, camera array, microphone, etc.) to capture data that may be processed using ML algorithms (e.g., neural network algorithms) to provide functionality to a user (e.g., image detection, voice recognition, efficient thermostat scheduling, etc.). IoT devices typically have limited processing power and therefore captured data may be transferred/streamed from the IoT device to another device or system for further processing (e.g., ML processing). As described herein, the subject technology provides a more efficient way to process the captured data without having to send it to computational resources on the cloud via Internet 160. The subject technology is not limited to these types of IoT devices and may involve other types of IoT devices such as smart appliances, weather centers, alarm systems, etc.

LANs 140B-140D may be implemented using the same or similar components as those described above with respect to LAN 140A. LANs 140B-140D may use the same number and type of components as LAN 140A or may use different numbers and/or types of components. As depicted in FIG. 1, LANs 140B-140D are represented by images of houses. The subject technology is not limited to residential users and may include LANs installed in multi-family developments, such as apartment complexes, as well as places of business. In addition, any of LANs 140A-140D may be implemented either as a physical network or as a virtualized network. A virtualized network may be based on a virtual LAN (VLAN) identified by a unique VLAN tag, where devices on the VLAN are connected logically on a physical LAN but may share physical resources of the physical LAN with one or more other VLANs while communications within the VLAN may be isolated from those of other VLANs.

Cloud controller 180 in FIG. 1 represents a server or group of servers configured to receive information from elements of service provider data network 120 and process the information for the operator of service provider data network 120. The information may include communications with reports from ML applications running on service provider data network 120. Cloud controller 180 may surface the information for the operator to view and make decisions. Cloud controller 180 also may be configured to initiate actions within service provider data network 120 to address issues/conditions indicated in the information.

Figure 2:
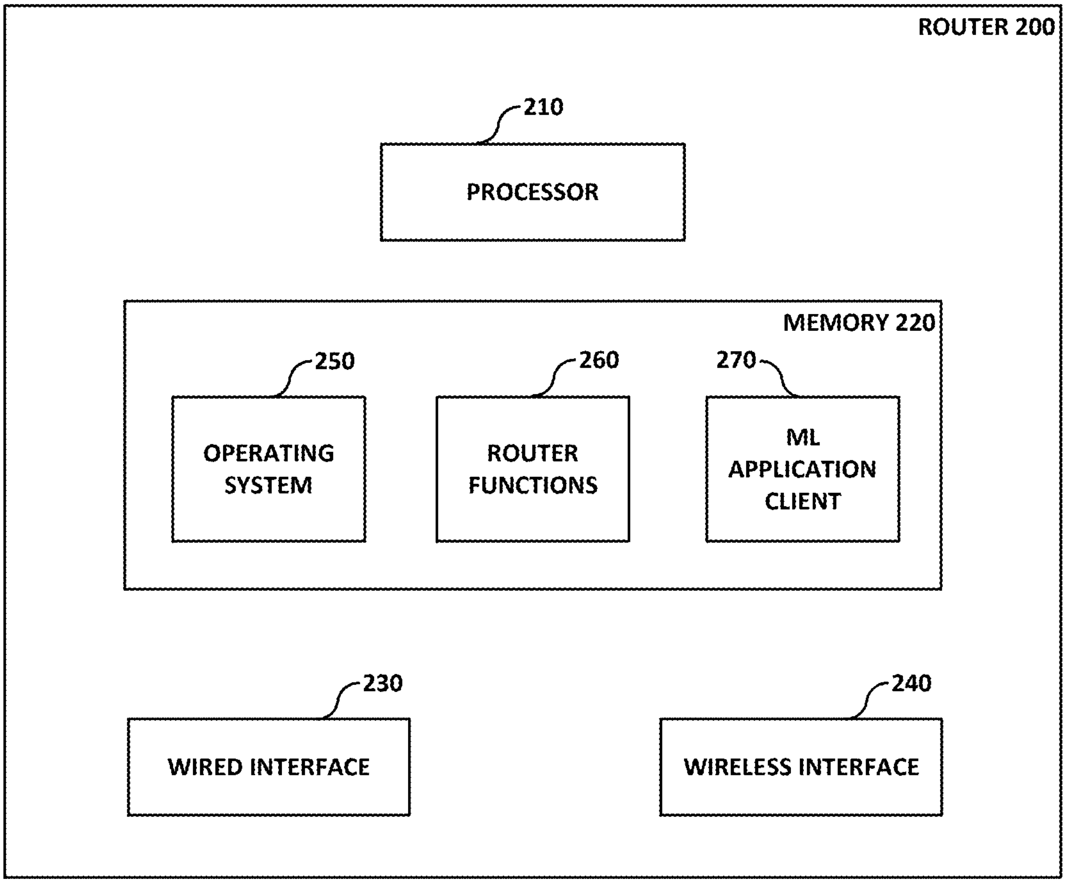
FIG. 2 illustrates an example of a routing device according to aspects of the subject technology.

FIG. 2 illustrates an example of a routing device according to aspects of the subject technology. Not all of the depicted components may be required, however, and one or more implementations may include additional components not shown in the figure. Variations in the arrangement and type of the components may be made without departing from the spirit or scope of the claims as set forth herein.

Depicted or described connections and couplings between components (including electrical and communicative connections and couplings) are not limited to direct connections or direct couplings and may be implemented with one or more intervening components unless expressly stated otherwise.

As depicted in FIG. 2, router 200 includes processor 210, memory 220, wired interface 230, and wireless interface 240. Processor 210 (e.g., processing circuitry) may include suitable logic, circuitry, and/or code that enables processing data and/or controlling operations of router 200. Functionality and operations of router 210 described herein may be implemented using software/firmware (e.g., instructions, code, subroutines, etc.) that is loaded and executed by processor 210 to provide the operations. In this regard, processor 210 may be configured to provide control signals to various other components of router 200. Processor 210 also may control transfers of data between components within router 200 and between router 200 and other devices or systems outside of router 200. Processor 210 may be implemented using circuitry such as Application Specific Integrated Circuits (ASIC), Field Programmable Gate Arrays (FPGA), Programmable Logic Devices (PLD), controllers, state machines, gated logic, discrete hardware components, or any other suitable devices.

Memory 220 may include suitable logic, circuitry, and/or code that enable storage of various types of data and information such as received data, generated data, code, and/or configuration information. Memory 220 may include, for example, random access memory (RAM), read-only memory (ROM), flash memory, etc. Memory 220 may include multiple types of memory such as volatile memory and non-volatile memory. As depicted in FIG. 2, memory 220 contains operating system 250, router functions 260, and ML application client 270, which are describe in further detail below.

According to aspects of the subject technology, operating system 250 comprises a computer program having one or more sequences of instructions or code together with associated data and settings. Upon executing the instructions or code, by processor 210 for example, one or more processes are initiated to manage the resources and operations of router 200 to implement the processes described herein.

According to aspects of the subject technology, router functions 260 comprise one or more computer programs having one or more sequences of instructions or code together with associated data and settings. Upon executing the instructions or code, by processor 210 for example, one or more processes may be initiated to execute routing operations for data communications within a network, such as LAN 140A described herein. Router functions 260 may be configured to reference and maintain one or more routing tables or other information used to control the routing of data communications within the network. Router functions 260 also may be configured to respond to and mitigate data traffic collisions and congestion with the network.

According to aspects of the subject technology, ML application client 270 comprises one or more computer programs having one or more sequences of instructions or code together with associated data and settings. Upon executing the instructions or code, by processor 210 for example, one or more processes may be initiated to monitor data streams originating from or directed to one or more devices connected to router 200 (e.g., smartphone 150, thermostat 152, and camera 154 in FIG. 1). ML application client 270 may include application functions to monitor data streams, identify data types and/or content of interest in the data streams, capture data from the data streams associated with the identified data types and/or content, generate requests for one or more ML operations to be performed on the captured data, and communicating the request and captured data to a device having ML capabilities. ML application client 270 may be used to monitor all data streams communicated through router 200 or may be limited to particular types of data streams, or to data streams associated with particular connected devices. In this example, router 200 represents an ML application client device.

According to aspects of the subject technology, wired interface 230 and wireless interface 240 may include suitable circuitry, logic, and/or code that enable the communication of data packets with router 200. Wired interface 230 and wireless interface 240 also may include structural elements to facilitate physical coupling of router 200 with transmission media to provide for the transmission of electrical signals encoded with the data packets over the transmission media. The subject technology is not limited to any particular network protocols and/or configurations and may use wired protocols such as Ethernet and/or wireless protocols such as WiFi (IEEE 802.11 standard). Each of wired interface 230 and wireless interface 240 may include a single interface through which all communication of data packets is executed, multiple interfaces of the same type to facilitate communication with different (e.g., multiple Ethernet ports, multiple WiFi connections, etc.).

Figure 3:
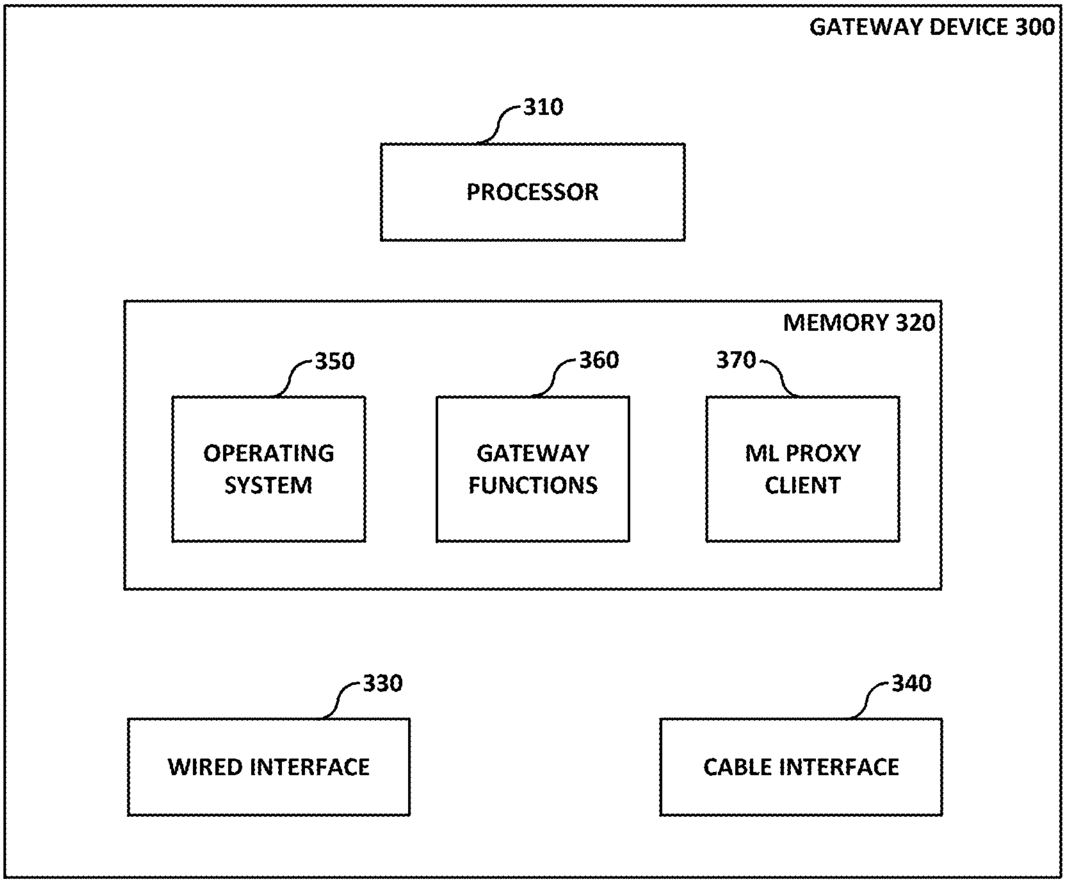
FIG. 3 illustrates an example of a gateway device according to aspects of the subject technology.

FIG. 3 illustrates an example of a gateway device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings) are not limited to direct connections or direct couplings and may be implemented with one or more intervening components unless expressly stated otherwise.

As depicted in FIG. 3, gateway device 300 includes processor 310, memory 320, wired interface 330, and wireless interface 240. Processor 310 (e.g., processing circuitry) may include suitable logic, circuitry, and/or code that enables processing data and/or controlling operations of gateway device 300. Functionality and operations of gateway device 300 described herein may be implemented using software/firmware (e.g., instructions, code, subroutines, etc.) that is loaded and executed by processor 310 to provide the operations. In this regard, processor 310 may be configured to provide control signals to various other components of gateway device 300. Processor 310 also may control transfers of data between components within gateway device 300 and between gateway device 300 and other devices or systems outside of gateway device 300. Processor 310 may be implemented using circuitry such as Application Specific Integrated Circuits (ASIC), Field Programmable Gate Arrays (FPGA), Programmable Logic Devices (PLD), controllers, state machines, gated logic, discrete hardware components, or any other suitable devices.

Memory 320 may include suitable logic, circuitry, and/or code that enable storage of various types of data and information such as received data, generated data, code, and/or configuration information. Memory 320 may include, for example, random access memory (RAM), read-only memory (ROM), flash memory, etc. Memory 320 may include multiple types of memory such as volatile memory and non-volatile memory. As depicted in FIG. 3, memory 320 contains operating system 350, gateway functions 360, and ML proxy client 370, which are described in further detail below.

According to aspects of the subject technology, operating system 350 comprises a computer program having one or more sequences of instructions or code together with associated data and settings. Upon executing the instructions or code, by processor 310 for example, one or more processes are initiated to manage the resources and operations of gateway device 300 to implement the processes described herein.

According to aspects of the subject technology, gateway functions 360 comprise one or more computer programs having one or more sequences of instructions or code together with associated data and settings. Upon executing the instructions or code, by processor 310 for example, one or more processes may be initiated to execute gateway operations for data communications between two disparate networks, such as service provider data network 120 and LAN 140A depicted in FIG. 1. The gateway operations may include formatting, translating, signaling, etc. to facilitate the flow of data packets from one type of network to another. The gateway operations also may include security features to protect the content of the data packets and limit or prohibit specified types of data transfers as well as data transfers from specified locations.

According to aspects of the subject technology, ML proxy client 370 comprises one or more computer programs having one or more sequences of instructions or code together with associated data and settings. Upon executing the instructions or code, by processor 310 for example, one or more processes may be initiated to process requests for ML processing to be performed and to communicate results of the requested ML processing. ML processing generally refers to the execution or performance of one or more ML operations on a set of data to generate a set of results. ML operations may include inference operations in which one or more ML models or algorithms are applied to a set of data to generate predictions or results. The results may include any type of structured or unstructured data (e.g., text, images, numerical values, etc.). ML operations may further include training operations in which an ML model or algorithm is applied to one or more sets of training data or labeled data to determine and refine parameters of the ML model or algorithm. The parameters of the ML model or algorithm may be determined and refined iteratively comparing results of the ML model or algorithm with desired results indicated in the labeled data and updating the parameters based on the comparison during the iterations.

ML proxy client 370 may be configured to communicate with ML application clients regarding requested ML processing as well as the data to be applied to ML operations associated with the requested ML processing. ML proxy client 370 may further be configured to communicate with one or more ML proxy servers regarding the requested ML processing, data to be applied to the ML operations associated with the requested ML processing, and the results of the ML processing. For example, ML proxy client 370 may receive an ML application request from an ML application client to perform an ML operation on a set of captured data. ML proxy client 370 may process the ML application request to identify the ML operations to be performed and any pre-processing requirements associated with the ML operations. In this context pre-processing refers to any type of modification and/or organization performed on a set of data before an ML model or algorithm is applied to the set of data. ML proxy client 370 may pre-process the set of captured data according to the identified pre-processing requirements (e.g., set/translate data size, data type, data format, arrangement of data content, etc.).

To have the requested ML operations performed, ML proxy client 370 may be configured to generate an ML proxy request that identifies the requested ML operations and contains the pre-processed set of data, or the location of that data for retrieval, and send the ML proxy request to an ML proxy server to perform the ML operations. Subsequent to sending the ML proxy request, ML proxy client 370 may be configured to receive an ML proxy response from the ML proxy server containing the results of the ML processing and/or messaging regarding the performance of the ML processing. ML proxy client 370 may be configured further to generate a report containing the results of the ML processing, or an indication of those results, to send to the service provider of the service provider data network (e.g., via cloud controller 180 in FIG. 1). In generating the report, ML proxy client 370 may be configured to convert and/or format the results of the ML operation to specifications provided by the service provider, for example, and to apply security measures in generating the report and communicating the report outside of the LAN. Security measures may include, but are not limited to, various encryption techniques for sending the report securely outside of the LAN and applying measures such as differential privacy algorithms to the data results to address individual privacy concerns. Differential privacy algorithms may refer to mathematical algorithms applied while generating the results of an ML operation to limit or prevent the ability to identify individual elements of the input data set based on the output results without negatively impacting the output results. In the foregoing examples, gateway device 300 represents an ML proxy client device.

According to aspects of the subject technology, wired interface 330 and cable interface 340 may include suitable circuitry, logic, and/or code that enable the communication of data packets with gateway device 300. Wired interface 330 and cable interface 340 also may include structural elements to facilitate physical coupling of gateway device 300 with transmission media to provide for the transmission of electrical signals encoded with the data packets over the transmission media. The subject technology is not limited to any particular network protocols and/or configurations and may use protocols such as Ethernet over wired interface 330 and DOCSIS cable interface 340. Each of wired interface 330 and cable interface 340 may include a single interface through which all communication of data packets is performed, multiple interfaces of the same type to facilitate communication with different (e.g., multiple Ethernet ports, multiple coaxial connections, etc.). The subject technology is not limited to these types of interfaces and may be implemented using other types of interfaces such as optical transmission lines (e.g., PON devices) and/or wireless data transmission (e.g., WiFi, IEEE 802.11 standards), for example.

Figure 4:
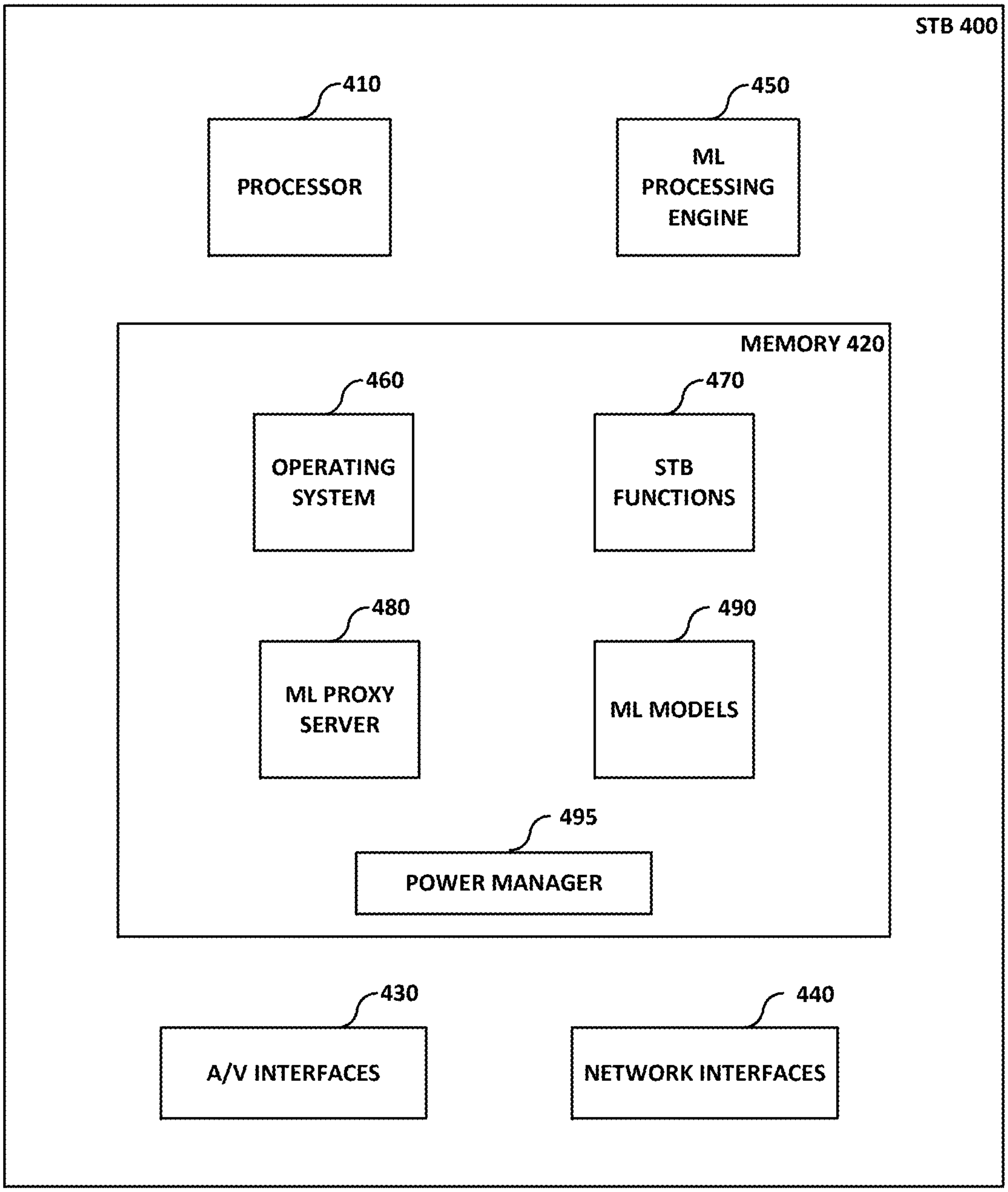
FIG. 4 illustrates an example of a multi-function appliance such as a set top box according to aspects of the subject technology.

FIG. 4 illustrates an example of a multi-function appliance such as a set top box according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings)

are not limited to direct connections or direct couplings and may be implemented with one or more intervening components unless expressly stated otherwise.

As depicted in FIG. 4, set top box (STB) 400 includes processor 410, memory 420, audio/video (A/V) interfaces 430, and network interfaces 440. Processor 410 (e.g., processing circuitry) may include suitable logic, circuitry, and/or code that enables processing data and/or controlling operations of STB 400. Functionality and operations of STB 400 described herein may be implemented using software/firmware (e.g., instructions, code, subroutines, etc.) that is loaded and executed by processor 410 to provide the operations. In this regard, processor 410 may be configured to provide control signals to various other components of STB 400. Processor 410 also may control transfers of data between components within STB 400 and between STB 400 and other devices or systems outside of STB 400. Processor 410 may be implemented using circuitry such as Application Specific Integrated Circuits (ASIC), Field Programmable Gate Arrays (FPGA), Programmable Logic Devices (PLD), controllers, state machines, gated logic, discrete hardware components, or any other suitable devices.

Memory 420 may include suitable logic, circuitry, and/or code that enable storage of various types of data and information such as received data, generated data, code, and/or configuration information. Memory 420 may include, for example, random access memory (RAM), read-only memory (ROM), flash memory, etc. Memory 420 may include multiple types of memory such as volatile memory and non-volatile memory. As depicted in FIG. 4, memory 420 contains operating system 460, STB functions 470, ML proxy server 480, and power manager 490, which are described in further detail below.

According to aspects of the subject technology, operating system 460 comprises a computer program having one or more sequences of instructions or code together with associated data and settings. Upon executing the instructions or code, by processor 410 for example, one or more processes are initiated to manage the resources and operations of STB 400 to implement the processes described herein.

According to aspects of the subject technology, STB functions 470 comprise one or more computer programs having one or more sequences of instructions or code together with associated data and settings. Upon executing the instructions or code, by processor 410 for example, one or more processes may be initiated to execute STB operations for accessing and utilizing services provided by the service provider data network (e.g., video content, data, telephony, gaming, etc.). The STB operations may include communications with a user via one or more user interfaces for selecting/controlling services accessed via STB 400 as well as receiving user feedback/input regarding the services. The STB operations also may include the decoding of content for presentation by STB 400 using one or more audio/video CODECs such as H.264, H.265, H.266, VP9, AV1, etc. for video content and AC3, AAC, He-AAC, MP3, WAV, etc. for audio content.

According to aspects of the subject technology, ML proxy server 480 comprises one or more computer programs having one or more sequences of instructions or code together with associated data and settings. Upon executing the instructions or code, by processor 410 for example, one or more processes may be initiated to perform proxy functions including, but not limited to, processing ML proxy requests received from an ML proxy client, performing ML operations indicated in the ML proxy requests on input data, and communicating the results of the ML operations back to the ML proxy client in an ML proxy response communication. In this example, STB 400 represents an ML proxy server device.

ML operations may include applying a set of input data to a trained ML model to perform an inference on the input data. The inference results may identify a pattern in the input data and/or make a prediction with respect to the input data. For example, an ML model may be trained to identify and/or track an object in image data captured by a camera. Another ML model may be trained to predict future network performance or usage from a data set capturing current or previous network traffic and conditions. The subject technology is not limited to any particular type of ML model.

ML models may involve the input of data to a mathematical algorithm that generates the inference results as an output. ML models may be defined with a set of parameters that identifies values used for variables in the mathematical algorithm (e.g., neural network model operations and parameters, etc.) and may specify types and formats for the input data. ML proxy server 480 may be capable of performing multiple types of inference operations using different sets of model parameters. ML models 490 depicted in FIG. 4 represents a library of parameter sets stored in memory 420 for available ML models. Based on an ML proxy request received from an ML proxy client, ML proxy server 480 may operate to select and retrieve a parameter set from ML models 490 that corresponds to an ML operation or inference indicated in the ML proxy request. The parameter set is used to invoke and configure ML processing engine 450 to perform the inference.

According to aspects of the subject technology, ML processing engine 450 (e.g., neural processing unit) may include suitable logic, circuitry, and/or code that is configurable to execute ML models to perform inferences on sets of input data. ML processing engine 450 may operate as a hardware accelerator where the logic and circuitry of ML processing engine 450 may be configured as a framework for implementing different ML models using the associated parameter sets. ML processing engine 450 may be implemented using circuitry such as Application Specific Integrated Circuits (ASIC), Field Programmable Gate Arrays (FPGA), Programmable Logic Devices (PLD), controllers, state machines, gated logic, discrete hardware components, or any other suitable devices.

The proxy functions provided by ML proxy server 480 further may include formatting the inference results generated by ML processing engine 450 and/or communicating the inference results back to the requesting ML proxy client in a proxy response.

According to aspects of the subject technology, power manager 495 comprises one or more computer programs having one or more sequences of instructions or code together with associated data and settings. Upon executing the instructions or code, by processor 410 for example, one or more processes may be initiated to manage operating modes and associated power consumption of STB 400. As described above, STB 400 may be used for both STB functions with STB functions 470 to access and consume services provided by an operator and perform proxy functions using ML proxy server 480. For example, power manager 495 may include processes for monitoring both STB operations and ML proxy operations within STB 400 to determine an appropriate operating mode (e.g., sleep mode) for STB 400. Even with no STB functions in operation, STB 400 may be providing ML proxy functions to perform requested inferences. Accordingly, power manager 495 may be configured to wait for a period of time during which no STB functions and no ML proxy functions are active before allowing STB 400 to enter a sleep mode.

According to aspects of the subject technology, audio/video (A/V) interfaces 430 may include suitable circuitry, logic, and/or code to enable the presentation of content and various communications to a user via one or more peripheral devices connected to STB 400 through A/V interfaces 430 such as televisions and speakers. In addition to content and communications, peripheral devices connected to STB 400 may be used to facilitate interaction with one or more user interfaces. For example, a connected keyboard, control pad, pointing device, etc. may facilitate the user selection of user interface items presented for display by STB functions 470. One or more microphones may be connected to STB 400 and used to capture audio signals including, but not limited to, user speech as user interface input, test signals used for calibration operations, etc. A/V interfaces 430 also may include structural elements to facilitate physical coupling of STB 400 with transmission media used to transmit and receive signals (e.g., audio signals, video signals, etc.) from connected peripheral devices. The subject technology is not limited to any particular protocols or interfaces and may be used for both analog and digital signal transmission.

As indicated above, one or more microphones may be connected to STB 400 to facilitate the capture of audio signals such as user speech. The ML capabilities available in STB 400 may be accessed to improve user interactions with STB 400. For example, ML models 490 may include parameter sets for models that perform speech-to-text operations, text-to-speech operations, image generation, video generation etc. These parameter sets may be used to invoke and configure ML processing engine 450 to process user speech captured by a microphone to generate text for display to the user and/or input to a user interface element, to process text generated by components of STB 400 or received by STB 400 from another device for audio presentation to a user via one or more speakers connected to STB 400, etc.

According to aspects of the subject technology, network interfaces 440 may include suitable circuitry, logic, and/or code that enable the communication of data with STB 400. Network interfaces 440 also may include structural elements to facilitate physical coupling of gateway device 300 with transmission media to provide for the transmission of electrical signals encoded with the data over transmission media. The subject technology is not limited to any particular network protocols and/or configurations and may use protocols such as Ethernet over a wired interface and WiFi (e.g., IEEE 802.11 protocols) over a wireless interface. Network interfaces 440 may include a single interface through which all communication of data is performed, multiple interfaces of the same type to facilitate communication with different (e.g., multiple Ethernet ports, multiple WiFi connections, etc.), or a combination of different types of network interfaces.

Figure 5:
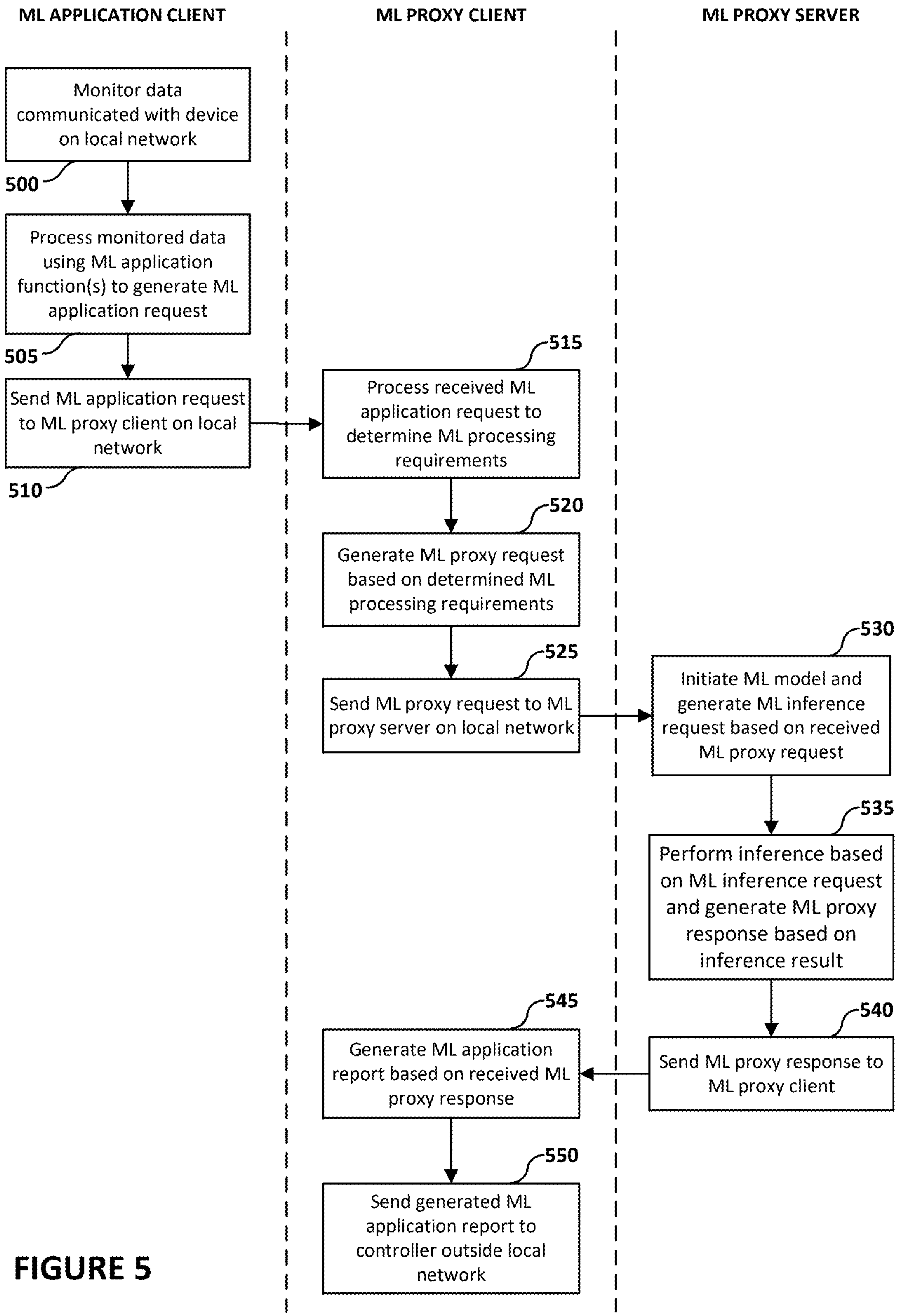
FIG. 5 is a flowchart illustrating operations of a machine learning proxy system according to aspects of the subject technology.

FIG. 5 is a flowchart illustrating the operation of a machine learning proxy system according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 5 may be performed in a different order from that shown and the process may not perform one or more of the illustrated blocks and/or may include one or more additional blocks.

The process represented in FIG. 5 includes operations performed by and communications between an ML application client, an ML proxy client, and an ML proxy server, such as the examples described above, to implement the functionality and operations described herein. According to aspects of the subject technology, the process includes the ML application client monitoring data communicated with a connected device on a LAN (block 500), processing the monitored data using ML application functions to generate an ML application request to perform an inference operation on data captured from the monitored data (block 505), and sending an ML application request to the ML proxy client on the LAN (block 510).

Figure 6:
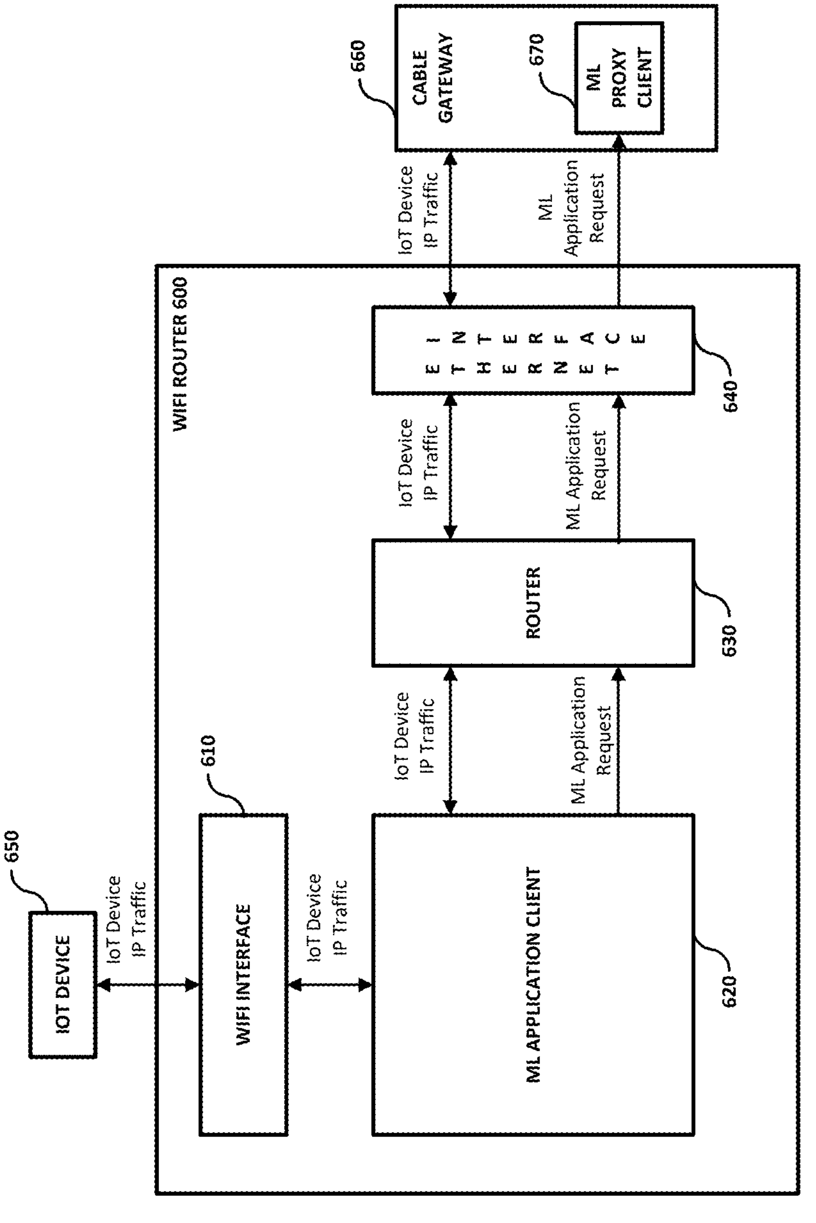
FIG. 6 is a block diagram illustrating data flows associated with the operation of a machine learning application client according to aspects of the subject technology.

FIG. 6 is a block diagram illustrating data flows associated with the operation of the ML application client described in blocks 500, 505, and 510 in FIG. 5 according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

As depicted in FIG. 6, WiFi router 600 (e.g., ML application client device) includes WiFi interface 610, ML application client 620, router 630, and Ethernet interface 640. Also depicted in FIG. 6 is IoT device 650 in communication with WiFi interface 610, and cable gateway 660 together with ML proxy client 670 in communication with Ethernet interface 640. Implementations and operations of these components are provided above and are not repeated here.

According to aspects of the subject technology, IoT device 650 may send and/or receive one or more data streams represented by IoT Device IP Traffic in FIG. 6. The data streams may originate from IoT device 650 or from a different entity outside of a LAN containing the components illustrated in FIG. 6. As represented in FIG. 6, the IoT Device IP Traffic is received either from IoT device 650 via WiFi interface 610 or from cable gateway 660 via Ethernet interface 640. Regardless of where the IoT Device IP Traffic originated, the data streams containing that data are processed by ML application client 620 to identify data types, patterns, content, etc. in the data streams that trigger an inference operation to be performed on data captured from the data streams according to functions provided by ML application client 620.

When an inference operation is to be performed on data captured from the monitored data by ML application client 620, an ML application request including an indication of the type of inference operation being requested and the captured data (or a location of the captured data) is generated by ML application client 620 and sent to ML proxy client 670 implemented on cable gateway 660 in FIG. 6 via router 630 and Ethernet interface 640.

Returning to FIG. 5, the process continues with the ML proxy client processing the ML application request received from the ML application client to determine ML processing requirements associated with the requested inference operation (block 515). The ML processing requirements may include an identifier for the ML model that is to be used for the requested inference processing as well as any data formatting specifications for the input data. The ML proxy client generates an ML proxy request based on the determined ML processing requirements (block 520) and sends the ML proxy request to the ML proxy server on the LAN (block 525). The ML proxy request may include the identifier for the ML model and the formatted data, or a location of the formatted data, to be used as an input to the ML model.

According to aspects of the subject technology, the ML proxy client and the ML proxy server may execute an initialization step (not depicted in FIG. 5) to perform mutual authentication between the ML proxy client and the ML proxy server. The mutual authentication is not limited to any particular type or number of authentication algorithms and may use public-key algorithms based on post quantum cryptography, for example. The mutual authentication may be performed at the time of launching the ML proxy client and ML proxy server, after the ML proxy client receives the ML application request, or at any other time prior to the ML proxy client sending the ML proxy request to the ML proxy server.

Figure 7:
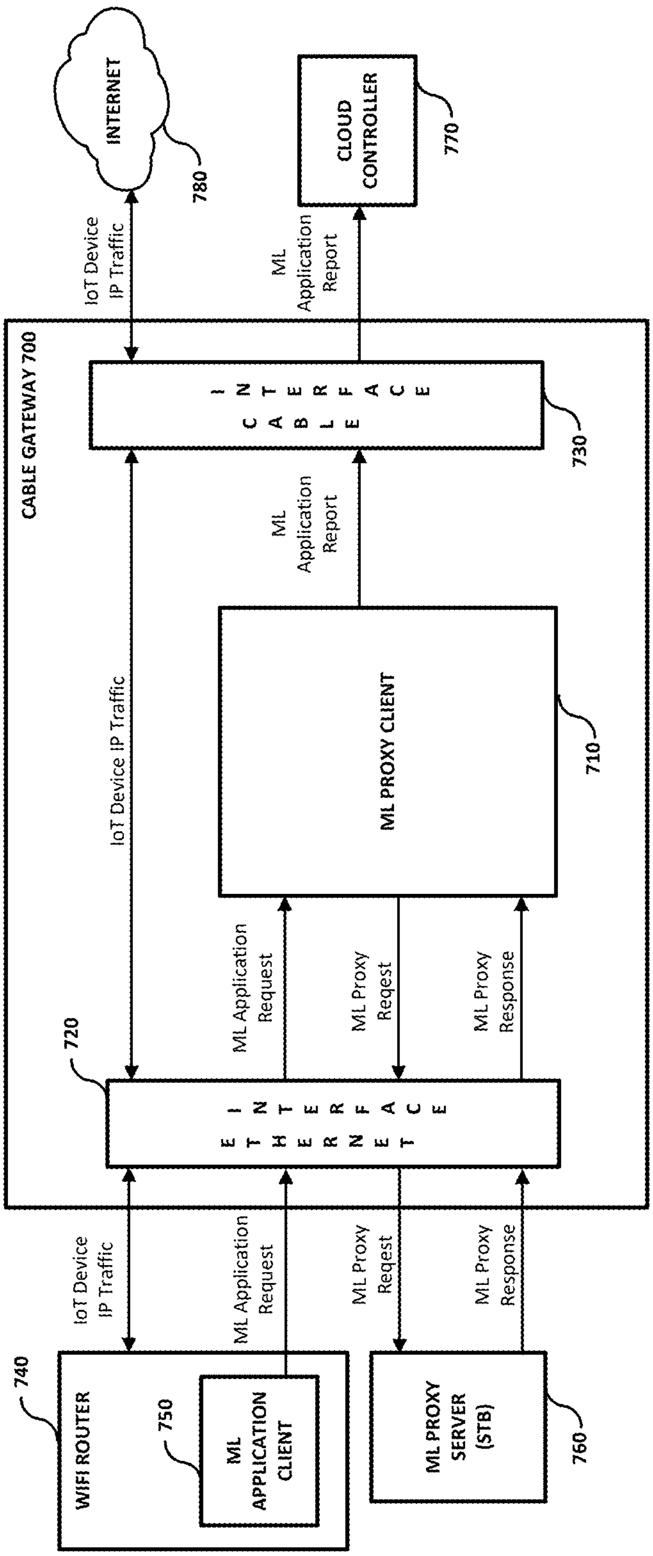
FIG. 7 is a block diagram illustrating data flows associated with the operation of a machine learning proxy client according to aspects of the subject technology.

FIG. 7 is a block diagram illustrating data flows associated with the operation of the ML proxy client described in blocks 515, 520, and 525 in FIG. 5 according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

As depicted in FIG. 7, cable gateway 700 (e.g., ML proxy client device) includes ML proxy client 710, Ethernet interface 720, and cable interface 730. Also depicted in FIG. 7 is WiFi router 740, together with ML application client 750, and ML proxy server 760 in communication with Ethernet interface 720, and cloud controller 770 and Internet 780 in communication with cable interface 730. Implementations and operations of these components are provided above and are not repeated here.

According to aspects of the subject technology, ML proxy client 710 receives the ML Application Request from ML application client 750 on WiFi router 740 via Ethernet interface 720. As described in the examples above, the received ML Application Request is processed by ML proxy client 710 to determine ML processing requirements used to generate an ML Proxy Request. The ML proxy request is sent to ML proxy server 760 on a set top box (STB) via Ethernet interface 720. The STB may have an Ethernet connection to cable gateway 700 that does not traverse WiFi router 740 allowing the ML proxy request to be sent to ML proxy server 760 bypassing WiFi router 740. Alternatively, the ML proxy request may be sent via WiFi router 740 to ML proxy server 760.

Returning to FIG. 5 again, the process continues with the ML proxy server initiating an ML model and generating an inference request based on the ML proxy request received from the ML proxy client (block 530). The initiated ML model may perform the inference based on the ML inference request and output an inference result used by the ML proxy server to generate an ML proxy response (block 535). The ML proxy server sends the ML proxy response to the requesting ML proxy client (block 540).

Figure 8:
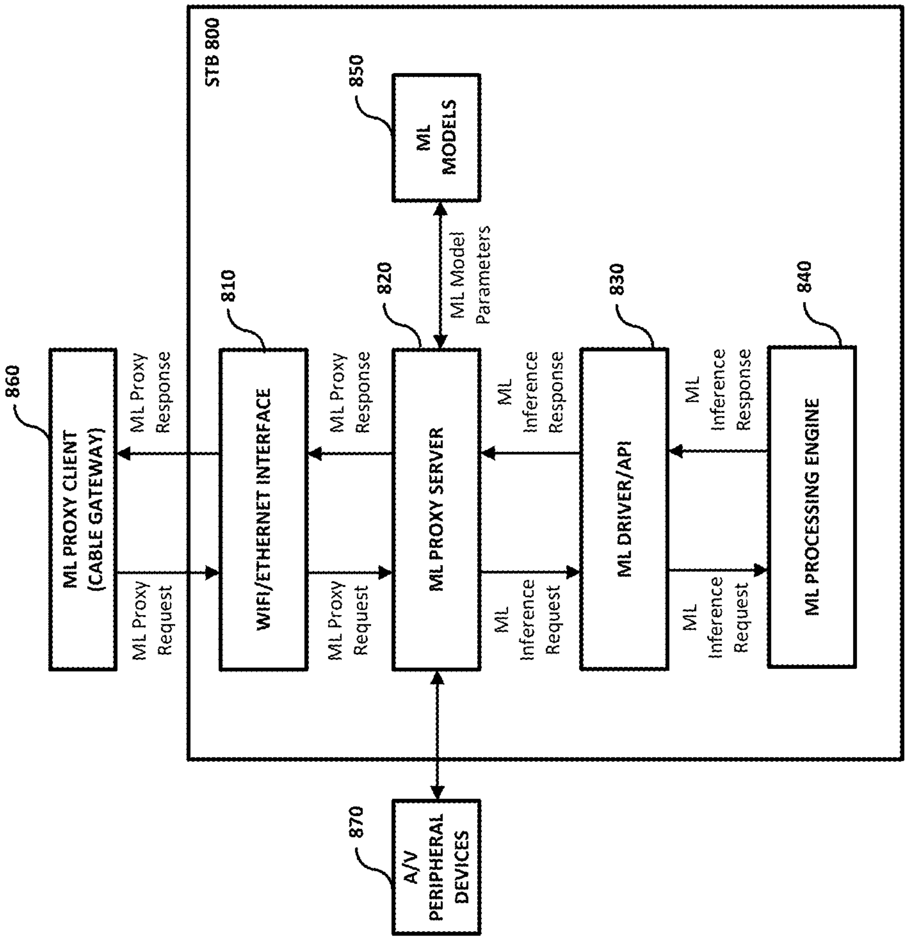
FIG. 8 is a block diagram illustrating data flows associated with the operation of a machine learning proxy server according to aspects of the subject technology.

FIG. 8 is a block diagram illustrating data flows associated with the operation of the ML proxy server described in blocks 515, 520, and 525 in FIG. 5 according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

As depicted in FIG. 8, STB 800 (e.g., ML proxy server device) includes WiFi/Ethernet interface 810, ML proxy server 820, ML driver/API 830, ML processing engine 840, and ML models 850. Also depicted in FIG. 8 is ML proxy client 860 on a cable gateway in communication with WiFi/Ethernet interface 810 and A/V peripheral devices 870 in communication with ML proxy server 820. Implementations and operations of these components are provided above and are not repeated here.

According to aspects of the subject technology, ML proxy server 820 receives the ML proxy request from ML proxy client 860 via WiFi/Ethernet interface 810. ML proxy server 820 generates an ML inference request based on the received ML proxy request and initiates an ML model on ML processing engine 840 using ML model parameters retrieved from ML models 850. The input data of the ML inference request is provided to ML processing engine 840 via ML driver/API 830 and the inference operation on the input data is performed by ML processing engine 840. An ML inference response including the inference results is provided to ML proxy server 820 by ML processing engine 840 via ML driver/API 830. ML proxy server 820 generates an ML proxy response that includes the inference results and sends the ML proxy response to ML proxy client 860 via WiFi/Ethernet interface 810.

Returning once again to FIG. 5, the ML proxy client generates an ML application report based on the received ML proxy response (block 545) and sends the generated ML application report to a controller outside of the LAN (block 550). As noted above, the ML proxy client may use various techniques and mechanisms to address privacy concerns related to sending the inference results outside of the LAN. As depicted in FIG. 7, ML proxy client 710 sends the ML application report to cloud controller 770 via cable interface 730.

As indicated in the examples above, the various components of the machine learning proxy system described herein may be implemented in different devices on a LAN. For example, the ML application client may be implemented in a WiFi router, the ML proxy client may be implemented in a cable gateway, and the ML proxy server may be implemented in a STB. However, the subject technology is not limited to these configurations. For example, the ML application client may be implemented directly in a connected device on the LAN or, alternatively, may be implemented on a cable gateway device. The ML proxy server and the ML processing engine may be implemented in the cable gateway device instead of the STB. In addition, the ML proxy client may be implemented on a node device in the service provider data network. Using this last configuration may allow the ML proxy client to send ML proxy requests to ML proxy servers located in different LANs within the service provider data network.

Figure 9:
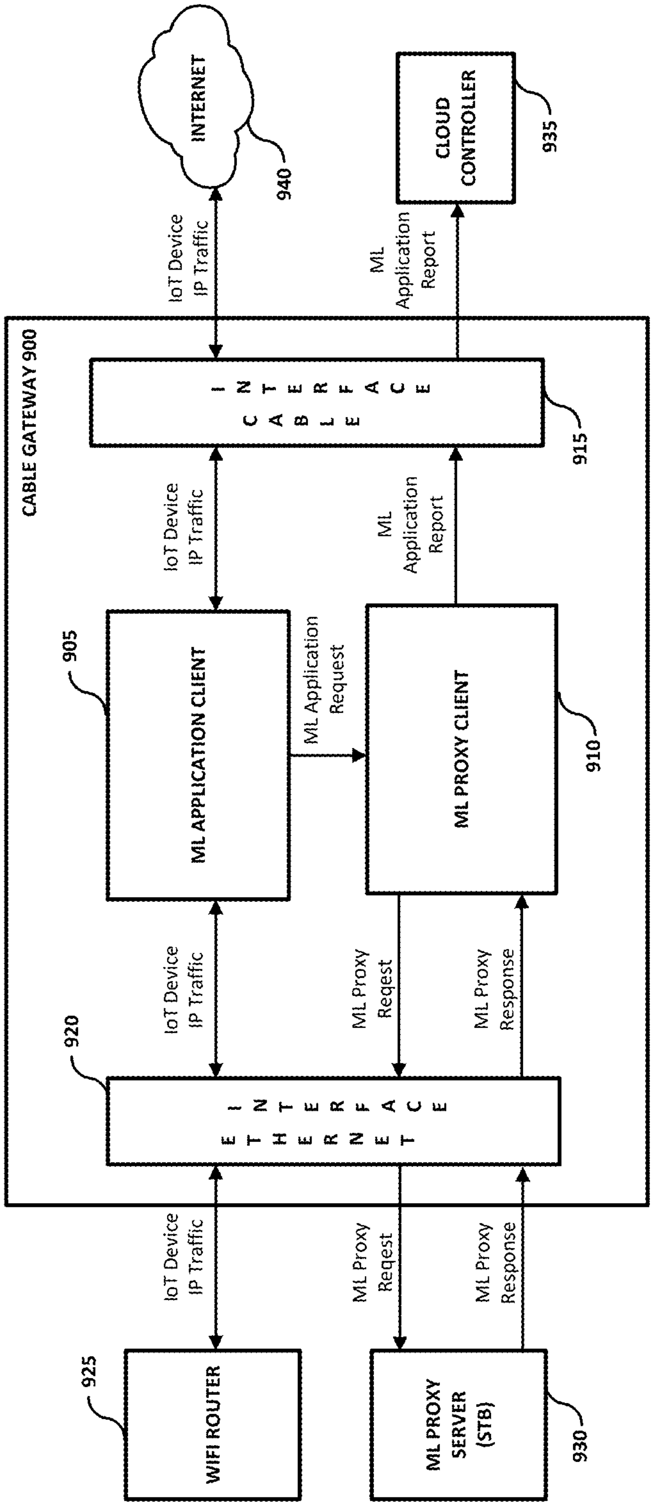
FIG. 9 is a block diagram illustrating data flows associated with the operation of a machine learning application client and a machine learning proxy client according to aspects of the subject technology.

FIG. 9 is a block diagram illustrating data flows associated with the operation of the ML application client and ML proxy client in an alternative configuration according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

According to aspects of the subject technology, cable gateway 900 includes ML application client 905, ML proxy client 910, cable interface 915, and Ethernet interface 920. WiFi router 925 and the STB on which ML proxy server 930 is implements are in communication with cable gateway 900 via Ethernet interface 920. Cloud controller 935 and the Internet 940 are in communication with cable gateway 900 via cable interface 915. The example depicted in FIG. 9 illustrates a configuration in which ML application client 915 is implemented on cable gateway 900 instead of WiFi router 915. Accordingly, the IoT Device IP Traffic is monitored and captured by ML application client 915 as the data passes through cable gateway 900 and the ML application request is generated by ML application client 915 and sent to ML proxy client 915 within cable gateway 900. With the exception of the foregoing data flow changes, the other data flows depicted in FIG. 9 operate as described above with respect to FIGS. 6 and 7. In this example, the ML application client and the ML proxy client are implemented on a single electronic device (e.g., cable gateway 900).

Figure 10:
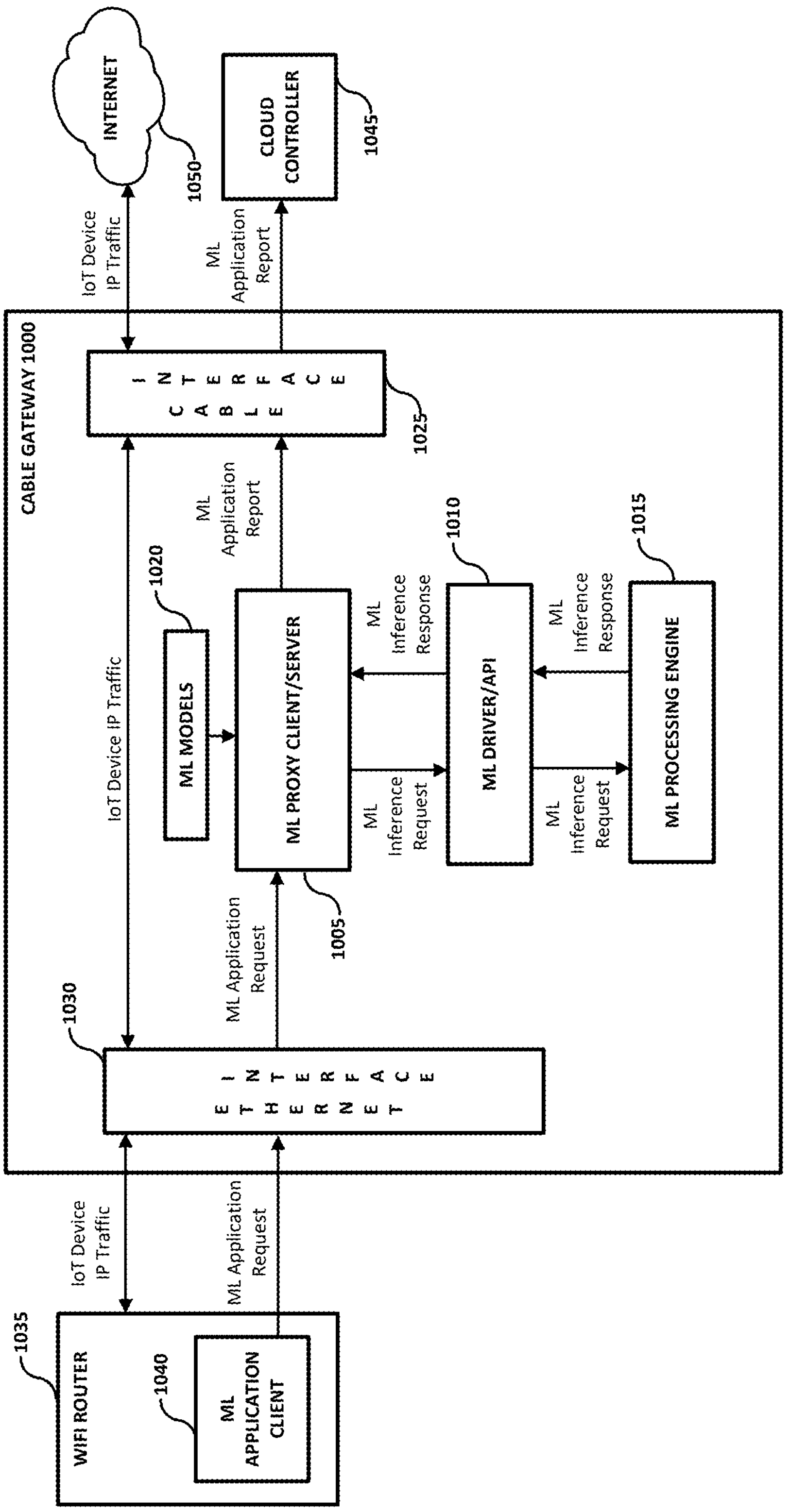
FIG. 10 is a block diagram illustrating data flows associated with the operation of a machine learning proxy client and a machine learning proxy server according to aspects of the subject technology.

FIG. 10 is a block diagram illustrating data flows associated with the operation of the ML proxy client and the ML proxy server in an alternative configuration according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

According to aspects of the subject technology, cable gateway 1000 includes ML proxy client/server 1005, ML driver/API 1010, ML processing engine 1015, ML models 1020, cable interface 1025, and Ethernet interface 1030. WiFi router 1035 and ML application client 1040 implemented on WiFi router 1035 are in communication with cable gateway 1000 via Ethernet interface 1030. Cloud controller 1045 and Internet 1050 are in communication with cable gateway 1000 via cable interface 1025. The example depicted in FIG. 10 illustrates a configuration in which ML proxy server 1005 and ML processing engine 1015, together with ML driver/API 1010, and ML models 1020, are implemented on cable gateway 1000 rather than on an STB. Accordingly, the generation and communication of ML inference requests and ML inference responses are performed internal to cable gateway 1000. Additionally, the retrieval of model parameters from ML models 102 and the configuration and operation of ML processing engine 1015 are performed internal to cable gateway 1000. With the exception of the foregoing data flow changes, the other data flows depicted in FIG. 10 operate as described above with respect to FIGS. 7 and 8. In this example, the ML proxy client and the ML proxy server are implemented on a single electronic device (e.g., cable gateway 1000).

Figure 11:
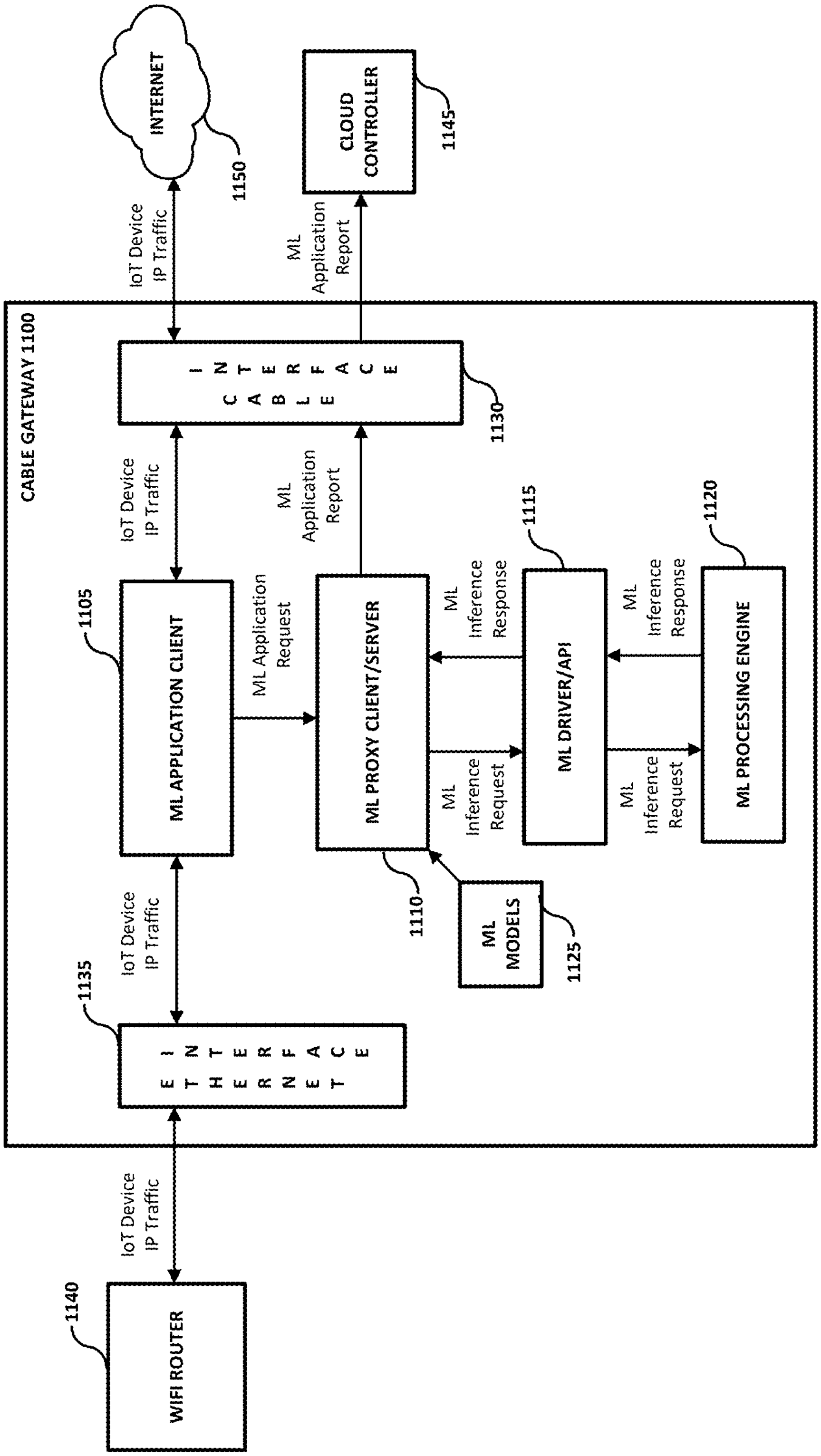
FIG. 11 is a block diagram illustrating data flows associated with the operation of a machine learning application client, a machine learning proxy client, and a machine learning proxy server in an alternative configuration according to aspects of the subject technology.

FIG. 11 is a block diagram illustrating data flows associated with the operation of the ML application client, the ML proxy client, and the ML proxy server in an alternative configuration according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections between components are not limited to direct connections and may be implemented with one or more intervening components unless expressly stated otherwise.

According to aspects of the subject technology, cable gateway 1100 includes ML application client 1105, ML proxy client/server 1110, ML driver/API 1115, ML processing engine 1120, ML models 1125, cable interface 1130, and Ethernet interface 1135. WiFi router 1140 is in communication with cable gateway 1100 via Ethernet interface 1135. Cloud controller 1145 and Internet 1150 are in communication with cable gateway 1100 via cable interface 1130. The example depicted in FIG. 11 illustrates a configuration in which the ML application client and the ML proxy server are implemented on cable gateway 1100 instead of on WiFi router 1140 and an STB, respectively. Accordingly, the changes to the data flows are a combination of the data flows represented in FIGS. 9 and 10. In this example, the ML application client, the ML proxy client, and the ML proxy server are all implemented on a single electronic device (e.g., cable gatewa According to aspects of the subject technology, an electronic device is provided that includes a first network interface configured to send and receive communications on a first network; a second network interface configured to send and receive communications on a second network different from the first network; computer-readable storage media storing one or more sequences of instructions; and processing circuitry configured to execute the one or more sequences of instructions to perform operations. The operations may include receiving an application request from an ML application client device on the first network, wherein the application request comprises application data captured by the ML application client device from one or more data streams communicated via the first and second networks with a connected device on the first network; sending a proxy request to an ML proxy server on the first network, wherein the proxy request comprises the application data and an indicated inference operation to be performed on the application data; receiving a proxy response from the ML proxy server, wherein the proxy response comprises a result of the inference operation performed on the application data by the ML proxy server; and sending a report based on the proxy response to a controller outside the first network via the second network interface.

The operations may further include pre-processing the application data based on parameters associated with the indicated inference operation, wherein the proxy request sent to the ML proxy server comprises the pre-processed application data. The operations may further include processing the results of the inference operation received in the proxy response, wherein the report sent to the controller comprises the processed results. Processing the results of the inference operation may include applying a differential privacy algorithm to the inference results.

The ML proxy server device may be configured to send a user notification based on the results of the inference operation for audio or visual presentation to a user via one or more peripheral devices in communication with the ML proxy server device, and receive a user response to the presented user notification, wherein the user response is captured via a user interface. The user interface may include a microphone and a natural language processor executed using a neural processing unit on the ML proxy server device.

The operations may further include performing a mutual authentication operation with the ML proxy server device. The ML application client device and the electronic device are a single device, and the operations may further include monitoring the one or more data streams communicated with the connected device on the first network for application data; and capturing the application data.

The first network may be a LAN operating at a first location, and the second network may be a service provider data network providing communications for a plurality of LANs operating at a plurality of different locations, respectively. The first network may be a virtualized local area network.

According to aspects of the subject technology, a method is provided that includes receiving an application request from an ML application client device on a first network, wherein the application request comprises application data captured by the ML application client device from one or more data streams communicated with a connected device on the first network and an indicated inference operation to be performed on the application data; pre-processing the application data based on parameters associated with the indicated inference operation; sending a proxy request to an ML proxy server on the first network, wherein the proxy request comprises the pre-processed application data and the indicated inference operation to be performed on the pre-processed application data; receiving a proxy response from the ML proxy server, wherein the proxy response comprises a result of the inference operation performed on the application data by the ML proxy server; and sending a report based on the proxy response to a controller on a second network outside the first network.

The method may further include processing the results of the inference operation received in the proxy response, wherein the report sent to the controller comprises the processed results. Processing the results of the inference operation may include applying a differential privacy algorithm to the inference results.

The method may further include sending a user notification based on the results of the inference operation to a network device on the first network for audio or visual presentation to a user via one or more peripheral devices in communication with the network device; and receiving a user response to the presented user notification from the network device via a user interface.

The method may further include monitoring the one or more data streams communicated with the connected device on the first network for application data; and capturing the application data associated with the ML application client.

According to aspects of the subject technology, a system is provided that includes A system, an ML application client configured to be executed on a first device on a first network to: monitor one or more data streams communicated with a connected device on the first network for application data associated with the ML application client; and capture the application data associated with the ML application client; an ML proxy server configured to be executed on a second device on the first network to: initiate and perform an ML inference operation; and an ML proxy client configured to be executed on a third device on the first network to: receive an application request from the ML application client, wherein the application request comprises application data captured by the ML application client from the one or more data streams communicated with the connected device; send a proxy request to the ML proxy server, wherein the proxy request comprises the application data and an indicated inference operation to be performed on the application data; receive a proxy response from the ML proxy server, wherein the proxy response comprises a result of the inference operation performed on the application data by the ML proxy server; and send a report based on the proxy response to a controller outside the first network.

The ML proxy client may be further configured to pre-process the application data based on parameters associated with the indicated inference operation, wherein the proxy request sent to the ML proxy server comprises the pre-processed application data. The ML proxy client may be further configured to process the results of the inference operation received in the proxy response, wherein the report sent to the controller comprises the processed results.

The first device may be the connected device. The first device and the second device may be a gateway device configured to communicatively couple the first network and a second network different from the first network.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. An electronic device, comprising:

a first network interface configured to send and receive communications on a first network;

a second network interface configured to send and receive communications on a second network different from the first network;

computer-readable storage media storing one or more sequences of instructions; and processing circuitry configured to execute the one or more sequences of instructions to perform operations comprising:

receiving an application request from a machine learning (ML) application client device on the first network, wherein the application request comprises application data captured by the ML application client device from one or more data streams communicated via the first and second networks with a connected device on the first network;

sending a proxy request to an ML proxy server device on the first network, wherein the ML proxy server device is separate from the electronic device and the proxy request comprises the application data and an indicated inference operation to be performed on the application data;

receiving a proxy response from the ML proxy server device, wherein the proxy response comprises a result of the inference operation performed on the application data by the ML proxy server device; and sending a report based on the proxy response to a controller outside the first network via the second network interface.

2. The electronic device of claim 1, wherein the operations further comprise:

pre-processing the application data based on parameters associated with the indicated inference operation, wherein the proxy request sent to the ML proxy server device comprises the pre-processed application data.

3. The electronic device of claim 1, wherein the operations further comprise:

processing the results of the inference operation received in the proxy response, wherein the report sent to the controller comprises the processed results.

4. The electronic device of claim 3, wherein processing the results of the inference operation comprises applying a differential privacy algorithm to the inference results.

5. The electronic device of claim 1, wherein the ML proxy server device may be configured to:

send a user notification based on the results of the inference operation for audio or visual presentation to a user via one or more peripheral devices in communication with the ML proxy server device; and receive a user response to the presented user notification, wherein the user response is captured via a user interface.

6. The electronic device of claim 5, wherein the user interface comprises a microphone and a natural language processor executed using a neural processing unit on the network device.

7. The electronic device of claim 1, wherein the operations further comprise:

performing a mutual authentication operation with the ML proxy server device.

8. The electronic device of claim 1, wherein the ML application client device and the electronic device are a single device, and wherein the operations further comprise:

monitoring the one or more data streams communicated with the connected device on the first network for application; and capturing the application data.

9. The electronic device of claim 1, wherein the first network is a local area network operating at a first location, and the second network is a service provider data network providing communications for a plurality of local area networks operating at a plurality of different locations, respectively.

10. The electronic device of claim 1, wherein the first network is a virtualized local area network.

11. A method, comprising:

receiving, by an electronic device on a first network, an application request from a machine learning (ML) application client device on the first network, wherein the application request comprises application data captured by the ML application client device from one or more data streams communicated with a connected device on the first network and an indicated inference operation to be performed on the application data;

pre-processing the application data based on parameters associated with the indicated inference operation;

sending, by the electronic device, a proxy request to an ML proxy server device on the first network, wherein the ML proxy server device is separate from the electronic device and the proxy request comprises the pre-processed application data and the indicated inference operation to be performed on the pre-processed application data;

receiving a proxy response from the ML proxy server device, wherein the proxy response comprises a result of the inference operation performed on the application data by the ML proxy server device; and sending a report based on the proxy response to a controller on a second network outside the first network.

12. The method of claim 11, further comprising:

processing the results of the inference operation received in the proxy response, wherein the report sent to the controller comprises the processed results.

13. The method of claim 12, wherein processing the results of the inference operation comprises applying a differential privacy algorithm to the inference results.

14. The method of claim 11, further comprising:

performing a mutual authentication operation with the ML proxy server device.

15. The method of claim 11, further comprising:

monitoring the one or more data streams communicated with the connected device on the first network for application data; and capturing the application data.

16. A system, comprising:

a machine learning (ML) application client configured to be executed on a first device on a first network to:

monitor one or more data streams communicated with a connected device on the first network for application data associated with the ML application client; and capture the application data associated with the ML application client;

an ML proxy server configured to be executed on a second device on the first network to:

initiate and perform an ML inference operation; and an ML proxy client configured to be executed on a third device on the first network, wherein the third device is separate from the second device, and wherein the ML proxy client is configured to:

receive an application request from the ML application client, wherein the application request comprises application data captured by the ML application client from the one or more data streams communicated with the connected device;

send a proxy request to the ML proxy server, wherein the proxy request comprises the application data and an indicated inference operation to be performed on the application data;

receive a proxy response from the ML proxy server, wherein the proxy response comprises a result of the inference operation performed on the application data by the ML proxy server; and send a report based on the proxy response to a controller outside the first network.

17. The system of claim 16, wherein the ML proxy client is further configured to:

pre-process the application data based on parameters associated with the indicated inference operation, wherein the proxy request sent to the ML proxy server comprises the pre-processed application data.

18. The system of claim 16, wherein the ML proxy client is further configured to:

process the results of the inference operation received in the proxy response, wherein the report sent to the controller comprises the processed results.

19. The system of claim 16, wherein the first device is the connected device.

20. The system of claim 16, wherein the first device and the second device are a gateway device configured to communicatively couple the first network and a second network different from the first network.

* * * * *